(No Model.)  2 Sheets—Sheet 1.

G. W. H. BROGDEN.
COUPLING FOR PIPES OR TUBES.

No. 401,996.   Patented Apr. 23, 1889.

Witnesses:
L. B. Whitaker.
Edwin S. Clarkson.

Inventor:
George W. H. Brogden
By his attys
Whitaker + Prevost (No Model.) 2 Sheets—Sheet 2.
G. W. H. BROGDEN.
COUPLING FOR PIPES OR TUBES.

No. 401,996. Patented Apr. 23, 1889.

Witnesses:
L. B. Whitaker.
Edwin S. Clarkson.

Inventor.
George W. H. Brogden
By his attys
Whitaker Prevost

UNITED STATES PATENT OFFICE.

GEORGE WILLIAM HARGREAVES BROGDEN, OF LONDON, ENGLAND.

COUPLING FOR PIPES OR TUBES.

SPECIFICATION forming part of Letters Patent No. 401,996, dated April 23, 1889.

Application filed October 20, 1888. Serial No. 288,615. (No model.)

*To all whom it may concern:*

Be it known that I, GEORGE WILLIAM HARGREAVES BROGDEN, a subject of the Queen of Great Britain, residing at London, England, have invented new and useful Improvements in the Method of Connecting Pipes or Tubes, of which the following is a specification.

My invention relates to pipes or tubes; and it consists, chiefly, in the employment of loose collars or rings which are formed in sections, so that they can be readily placed upon the ends of the pipes or tubes to be connected, the said collars or rings being adapted to bear against flanges or projections on the said pipes or tubes and to be held together by bolts or their equivalents.

Figure 1:
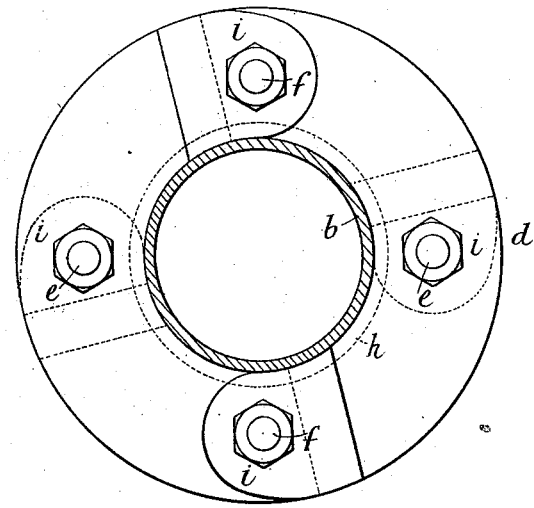
Figure 2:
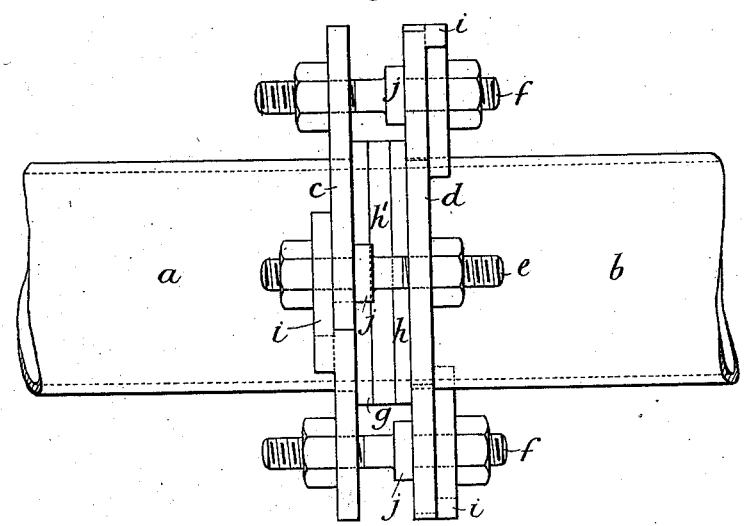
Figure 3:
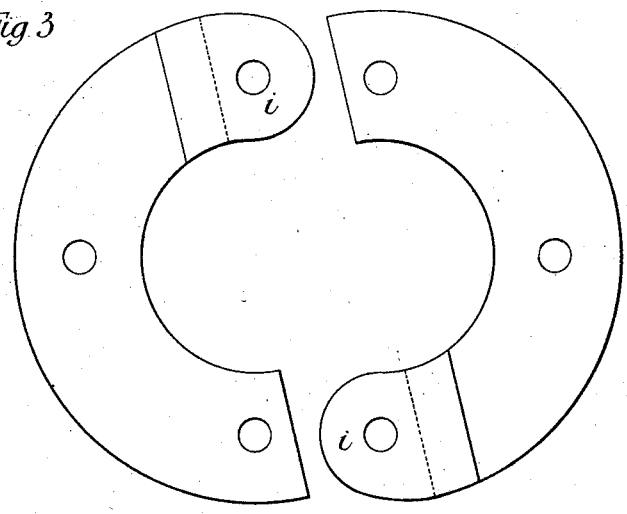
Figure 4:
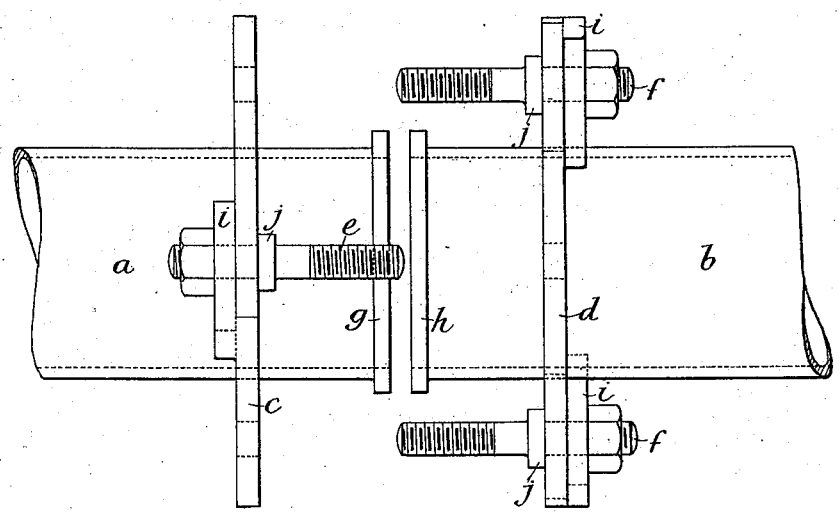

In the accompanying drawings, Figure 1 is an end elevation illustrating the arrangement of the collars or rings for connecting two adjacent pipes or tubes, and Fig. 2 is a side elevation of the same. Fig. 3 is a view showing the sections of the flange detached; and Fig. 4 is a view similar to Fig. 2, but showing the collars or rings disconnected from each other.

$a\ b$ indicate the adjacent end portions of two pipes or tubes to be connected; $c\ d$, the sectional collars or rings, and $e\ e\ f\ f$ the bolts or studs.

$g\ h$ are flanges which are formed upon the ends of the pipes $a\ b$, respectively, and which serve to maintain the collars or rings upon the pipes; and $h'$ is a packing-ring, which is placed between the adjacent tubes. Each of the collars or rings $c\ d$ is formed in two sections, as shown in Fig. 3, and one end of each section has advantageously formed integral with it a tongue, $i$, against which the plain end of the other section of the collar can lie, as shown most clearly in Figs. 2 and 4, so that the face of the collar in contact with the flange will be close to the latter.

The sections of each collar are preferably connected together by the bolts, which also serve to unite adjacent collars. As shown in the drawings, each of the said bolts is provided with a collar, $j$, between which and a nut the tongue of one section and the adjacent end of the other section of each collar are clamped, so that the said sections are rigid relatively to each other.

In jointing two adjacent pipes the collars are first of all applied to the respective tubes, and then moved toward each other so that the studs $e$ of the collar $c$ enter holes between the studs $f$ of the collar $d$, and vice versa, the whole being finally secured by nuts, as indicated in Fig. 2.

I wish it understood that I do not confine myself to the construction shown in the drawings, as it is obvious that each collar may be formed in more than two sections, if desired, and that other means than those described may be employed for uniting the several sections of each collar together.

The chief advantage of my invention is that by the employment of loose collars much less room is required for the stowage of a given number of pipes or tubes for transport than for the same number provided with flanges of the ordinary construction.

Having now particularly described and ascertained the nature of my said invention and in what manner the same is to be performed, I declare that what I claim is—

The combination, with the pipes each provided with a flange adjacent to its ends, of rings or flanges encircling said pipe and engaging said flanges, consisting of two parts, each provided at one end with an offset to receive the plain end of the other part, and bolts having one end extending through the ends of the portions of said ring, each bolt having a shoulder engaging the inner face of said ring and a nut on said bolt engaging its outer face, the free end of said bolts being adapted to engage apertures in the opposing flange and provided with nuts, substantially as described.

GEORGE WILLIAM HARGREAVES BROGDEN.

Witnesses:
JOHN E. BONSFIELD,
F. W. PRICE.